Figure 1:
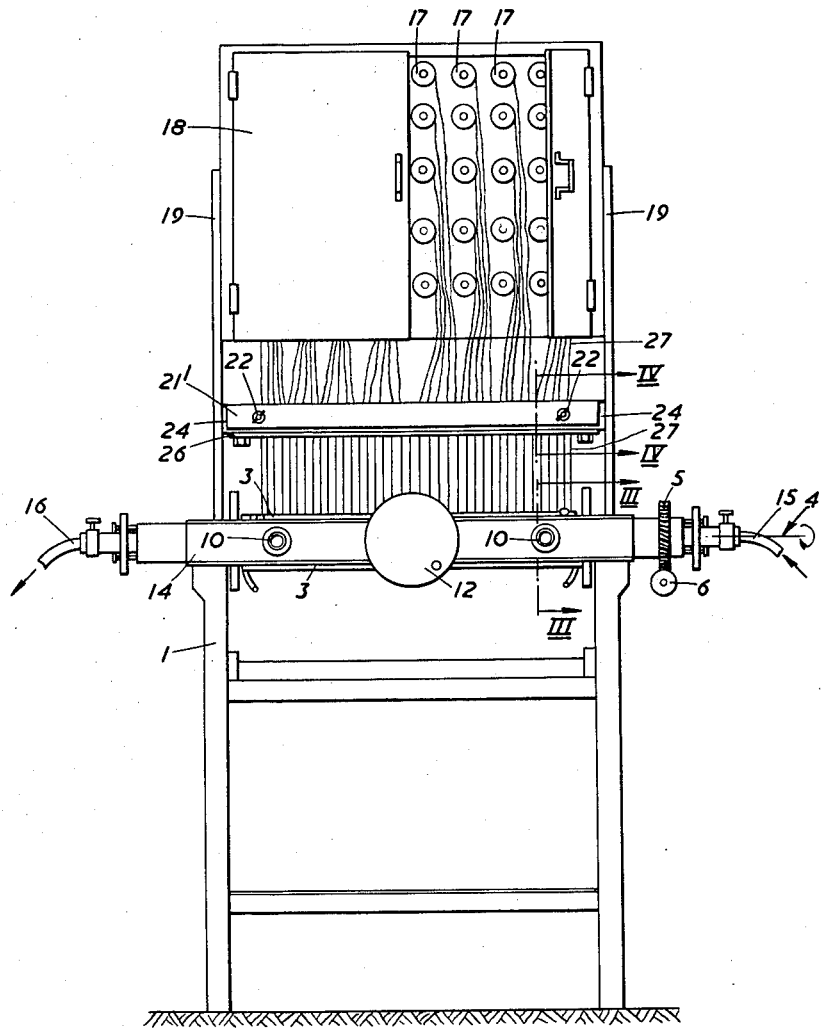

Nov. 27, 1962     D. PERNICI     3,065,504
MACHINE FOR MANUFACTURING CANDLES
Filed Oct. 27, 1960     2 Sheets-Sheet 1

INVENTOR
Domenico Pernici,
BY
Pierce, Scheffler & Parker
his ATTORNEYS

Nov. 27, 1962 D. PERNICI 3,065,504
MACHINE FOR MANUFACTURING CANDLES
Filed Oct. 27, 1960 2 Sheets-Sheet 2

INVENTOR
Domenico Pernici,
BY
Pierce Scheffler & Parker
his ATTORNEYS

3,065,504
MACHINE FOR MANUFACTURING CANDLES
Domenico Pernici, Alzano Lombardo, Bergamo, Italy
Filed Oct. 27, 1960, Ser. No. 65,344
5 Claims. (Cl. 18—27)

This invention relates to a machine for manufacturing candles.

In a conventional machine for manufacturing candles the liquid wax is poured into the cavities corresponding to the desired candle shapes, of a casting mould, into which the wicks are introduced from top. After cooling the candles cast, these are ejected by means of ejector pistons from the cavities of the casting mould.

This conventional machine has various disadvantages. The candles must be completely cooled and solidified before they can be ejected by means of the ejector pistons. Only candles or limited length can be manufactured and above all it is possible to manufacture only candles with smooth and regular cross-sections. Moreover the machine has a height of at least thrice the length of the candles manufactured.

To manufacture candles of particular shape the casting mould must be taken out of the machine and must be opened, in order that the finished candles can be taken out, whereby a considerable loss of time is caused and the production of the machine is correspondingly low.

It is an object of the invention to provide a machine with which the disadvantages mentioned are overcome. With the machine according to the invention it is possible to make candles of any shape and any length, without making the machine become too big and without having to take the mould out of the machine. The wicks introduced into the cavities of the mould are automatically drawn along with every casting process.

The principle of the invention is that the machine contains a rotatable support for one half of the mould and a longitudinally translatable support for the other half of the mould; the rotatable support being apt to carry a number, for instance three, four or more halves of mould, which by rotation of the support are put to operating position successively. The displaceable support being every time the second half against the half fixed to the rotatable support. Said second half may always be the same, or it may be changed at every casting process, as better described hereinafter. The wicks are introduced into the cavities of the mould from coils in known manner and after the first casting process, they are always pulled along with the subsequent casting processes.

Between the coils and the cavities of the mould there is provided a centering and tensioning device for the wicks.

In the accompanying drawings, there are shown in diagrammatical form two examples of embodiment of the machine according to the invention.

Production can be considerably increased by automatizing the controls.

Figure 2:
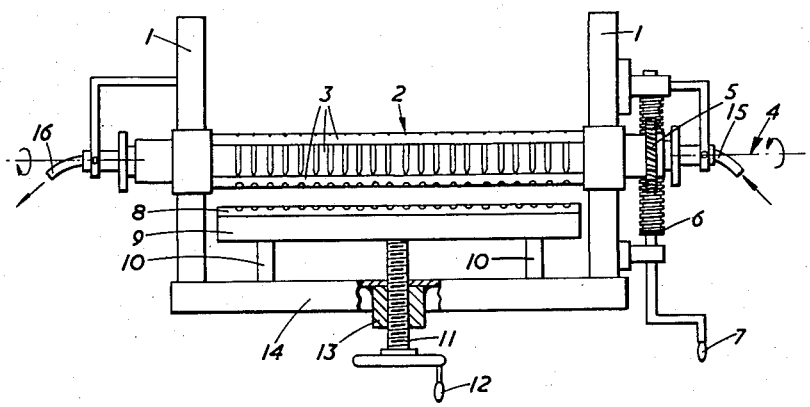
Figure 4:
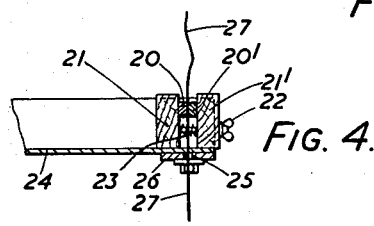
Figure 3:
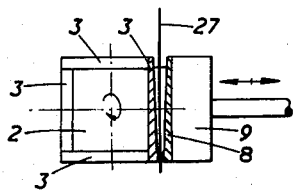
Figure 5:
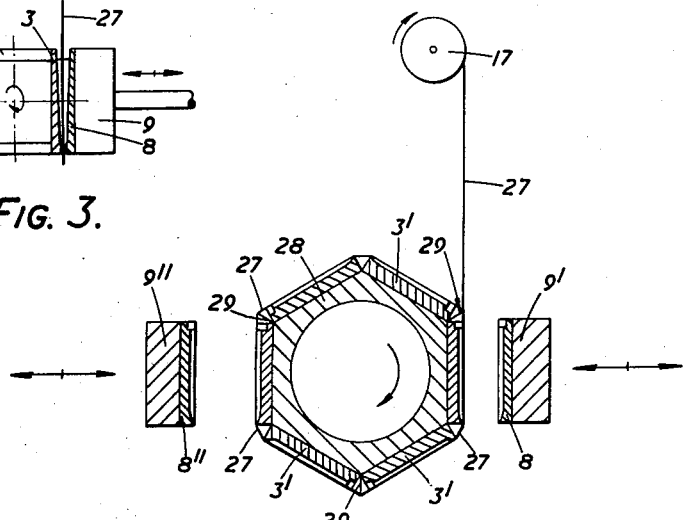

FIG. 1 shows the machine in front view;
FIG. 2 shows a top of the two supports of the mould;
FIG. 3 shows the supports of the mould in cross-section;
FIG. 4 shows the centering and tensioning device for the wicks in cross-section.
FIG. 5 shows diagrammatically a second embodiment.

In the embodiment according to FIGS. 1 to 4, on the machine frame 1 there is supported the rotatable mould support 2. According to the example of embodiment shown this support has rectangular cross-section and, therefore, can carry four mould halves 3. The mould-support 2 is rotatable about its own axis, which takes place through the helical gear 5, the screw 6 and the handwheel 7.

The second mould half 8 is fastened on a longitudinally displaceable mould-support 9, is guided on the mandrel 10 and displaceable by means of a screw 11 and hand-wheel 12 as well as nut 13, in such a way that the mould-half 8 is brought to operating position with respect to a mould-half 3 and can be extracted therefrom. The screw-nut 13 and the guides 10 are fixed at a traverse 14 of the machine frame. The rotatable mould-support is hollow; through it there passes a conduit for cooling water, the inlet of which is indicated by 15 and the outlet by 16.

Two side supports 19 carry, above the mould-supports, a case 18 in which there are stored the wick coils 17 from which the wicks 27 are coiled off.

The centering and tensioning device (FIG. 4) for the wicks 27 consists of two traverses 21, 21', to which are fixed foam rubber lists 20, 20'. The two traverses 21, 21' are set by means of wing screws 22 and springs 23 at such mutual distance, that the wicks 27 passed through the foam rubber lists 20, 20' are tensioned in the desired way. The whole device is fastened at the side supports by means of holders 24. Below the tensioning device there is fastened a centering list 26, the apertures 25 whereof lie accurately axially centered above the cavities of the closed casting mould.

Operation of the machine is as follows:

By turning the hand wheel 12 the mould half 8 is brought against the mould-half 3, the wicks 27 are previously introduced into the mould cavities and passed through downwards, so that the wicks, after the complete feeding of the second mould half 8, are held centrically in the mould cavity by the lower mould end, which corresponds to the candle tip. Now the first casting operation can be carried out.

The further processes may be carried out in twofold manner. With the first manner, the displaceable mould support 9 is withdrawn and the mould half remains sticking to the mould-half 3. This can be attained in simple manner by holding by means of a release clamp the mould-half 8 in operating position, while the support 9 is withdrawn without the mould. Now the mould-support 2 is turned by 90°, so that a further mould-half 3 assumes operating position; at the support 9 a further mould-half 8 is attached and the next casting operation can take place. The wicks have thereby come automatically into the cavities of the moulds which now are in operating position.

The same cycle is repeated until all of the four mould halves 3 of the turning mould support are filled. Now the first mould finds itself with the cast candles upwards. The mould-half 8 is taken off and the moulds are taken out from the open mould-half 3.

The opening of the mould, namely the taking-off of the mould-half 8, however, might take place already after the second or third casting cycle, that is to say, downwards or rearwards.

With the working method as above described, therefore, after every casting cycle, a new mould-half is exposed on displaceable supports 9.

The second manner of operation works with one single mould-half 8, which is fastened rigidly on the support 9 and also is pulled off from the mould-half 3 after each casting cycle. In this case it is merely necessary to wait after every casting cycle until the candles have become sufficiently solid as not to undergo any more change of shape after taking-off the second mould-half. Experience shows that the solidification of the wax, at least to such extent that no change of shape takes place any longer, is very rapid, in particular if care is taken to cool adequately.

In order to prevent the cast candles from becoming pulled off from the mould-half 3 when the mould-half 3 is withdrawn, there may be usefully provided a holding device at the ends of the initial casting extending over the whole length of the mould.

In order to attain a higher production, the machine—as diagrammatically represented in FIG. 5—may be made with two longitudinally displaceable mould-supports 9', 9'', the rotatable mould support 28 being made in polygonal shape. This polygonal rotatable mould-support is equipped for instance with six mould-halves 3', which are arranged in such a way that the contiguous mould halves are always directed towards each other by the candle tip and the candle end respectively. Thereby every two mould-halves facing each other diametrally come to assume the vertical casting position with the candle tip downwards. After every casting cycle, this rotatable mould support 28 is rotated on by two sixths of its circumference, that is to say, one mould-half is skipped in further rotation. In that way, there always come two diametrally opposite mould-halves to assume the vertical casting position with the candle tip downwards. The wicks 27 un-wound from the coils 17, are automatically pulled along with every step of rotation of the rotatable mould-support, and they run automatically into the successive mould halves. The wicks 27 are held in the mould halves at one side by the pointed lower mould ends and at the other side by means of special guides 29 axially centered in the moulds. These guides are provided between the mould-halves (at the ends corresponding to the candle end) and extend over the whole length of the moulds.

Further practical embodiments, in particular with respect to the control of the movements, are possible, which may be obtained by means of hydraulic, pneumatic or oleodynamic control devices.

I claim:

1. A machine for manufacturing candles by pouring wax into the cavities of a casting mould, comprising in combination: a casting mould consisting of a rotatable support 2 having polygonal cross-section, each side of which forms a mould-half 3; a displaceable support 9 carrying counter-half-moulds 8 for said mould halves and arranged at one side of said rotatable support; a wick feeding device arranged above said casting mould; a wick tensioning and centering device arranged between said wick feeding device and said casting mould; means to rotate said casting mould; and means to displace said displaceable support from and towards said rotatable support.

2. A machine for manufacturing candles by pouring wax into the cavities of a casting mould, comprising in combination: a casting mould consisting of a rotatable support 28 having polygonal cross-section, each side of which forms a mould-half 3'; two displaceable supports 9', 9'' each carrying counter-half-moulds 8', 8'' for said mould-halves and arranged at opposite sides of said rotatable support; a wick feeding device arranged above said casting mould; a wick tensioning and centering device arranged between said wick feeding device and said casting mould; means to rotate said casting mould; and means to displace said displaceable supports from and towards said rotatable support.

3. The machine defined in claim 1, in which the mould cavities formed by said mould halves 3 and said counter-half-moulds 8 are tapered and pointed at their lower ends so that the wicks introduced therein are clamped by said lower ends of the moulds.

4. The machine defined in claim 2, in which the mould cavities formed by said mould halves 3' and said counter-half-moulds 8', 8'' are tapered and pointed at one end so that the wicks introduced therein are clamped by said ends of the moulds.

5. The machine defined in claim 2, in which said polygonal rotatable support has six sides, whereby the adjacent mould halves formed by said sides are arranged with respect to each other tip-to-tip and base-to-base, respectively.

References Cited in the file of this patent

UNITED STATES PATENTS

| | | |
|---|---|---|
| 27,995 | Massey | Apr. 24, 1860 |
| 106,550 | Christen | Aug. 23, 1870 |
| 269,885 | Royean | Jan. 2, 1883 |
| 280,566 | Brelivet | July 3, 1883 |
| 305,787 | Brelivet | Sept. 30, 1884 |
| 1,993,709 | Chamberlain | Mar. 5, 1935 |
| 2,007,773 | Schroeder | July 9, 1935 |

FOREIGN PATENTS

| | | |
|---|---|---|
| 331,716 | Germany | Jan. 13, 1921 |